United States Patent
Sakaguchi

(10) Patent No.: US 8,398,870 B2
(45) Date of Patent: Mar. 19, 2013

(54) METHOD FOR MANUFACTURING PERPENDICULAR MAGNETIC RECORDING MEDIUM

(75) Inventor: Ryuji Sakaguchi, Ichihara (JP)

(73) Assignee: Showa Denko K.K., Tokyo (JP)

( * ) Notice: Subject to any disclaimer, the term of this patent is extended or adjusted under 35 U.S.C. 154(b) by 565 days.

(21) Appl. No.: 12/567,389

(22) Filed: Sep. 25, 2009

(65) Prior Publication Data

US 2010/0084373 A1     Apr. 8, 2010

(30) Foreign Application Priority Data

Sep. 29, 2008   (JP) ................................. 2008-249627

(51) Int. Cl.
     *B44C 1/22* (2006.01)
(52) U.S. Cl. ............................... 216/22; 451/41; 216/79
(58) Field of Classification Search ............... 106/31.13; 205/109; 216/22; 360/110, 135, 99.12; 427/570; 428/143, 810, 828.1, 831.2, 836.2, 846.9; 451/41, 63; 505/430; 546/109
See application file for complete search history.

(56) References Cited

U.S. PATENT DOCUMENTS

| | | | |
|---|---|---|---|
| 4,174,447 A * | 11/1979 | Fields ............................ | 546/109 |
| 6,117,220 A | 9/2000 | Kodama et al. | |
| 6,974,368 B2 | 12/2005 | Horie et al. | |
| 7,255,809 B2 | 8/2007 | Horie et al. | |
| 2001/0041511 A1 * | 11/2001 | Lack et al. ....................... | 451/41 |
| 2003/0226378 A1 * | 12/2003 | Okuyama et al. .................. | 65/61 |
| 2005/0238927 A1 | 10/2005 | Horie et al. | |
| 2006/0027527 A1 * | 2/2006 | Yokota et al. .................... | 216/22 |
| 2006/0283716 A1 * | 12/2006 | Hafezi et al. ................... | 205/291 |
| 2007/0123153 A1 | 5/2007 | Kumasaka et al. | |
| 2007/0172660 A1 * | 7/2007 | Koga et al. ..................... | 428/408 |
| 2008/0131737 A1 | 6/2008 | Sakaguchi et al. | |

FOREIGN PATENT DOCUMENTS

| | | |
|---|---|---|
| JP | 2000-273445 A | 10/2000 |
| JP | 2004-178777 A | 6/2004 |
| JP | 2004-259417 A | 9/2004 |
| JP | 2005-310324 A | 11/2005 |
| JP | 2007-115388 A | 5/2007 |
| JP | 2007-149203 A | 6/2007 |
| JP | 2008-108396 A | 5/2008 |
| WO | WO 2004/101695 | * 11/2004 |

OTHER PUBLICATIONS

Japanese Notice of Reasons for Rejection issued in Japanese Application No. 2008-249627 mailed Mar. 27, 2012.

* cited by examiner

*Primary Examiner* — Dah-Wei Yuan
*Assistant Examiner* — Erin Bergner
(74) *Attorney, Agent, or Firm* — Sughrue Mion, PLLC

(57) ABSTRACT

There is provided a method for manufacturing a perpendicular magnetic recording medium that includes a step for forming a smooth substrate surface without generating abnormal protrusions or the like when forming a magnetic film or the like on the surface of the substrate, the method for manufacturing a perpendicular magnetic recording medium characterized by including a polishing step in which the surface of a non-magnetic substrate is smoothed before forming the laminated structure on top of the non-magnetic substrate, wherein a polishing liquid used in the polishing step contains diamond particles within a range from 0.001 to 0.05% by mass and also contains a polishing accelerator within a range from 10 to 100 times the amount of diamond particles, and the polishing accelerator is an organic polymer material containing a sulfonic group or a carboxylic group and having an average molecular weight of 4,000 to 10,000.

12 Claims, 3 Drawing Sheets

METHOD FOR MANUFACTURING PERPENDICULAR MAGNETIC RECORDING MEDIUM

BACKGROUND OF THE INVENTION

1. Field of the Invention

The present invention relates to an improved method for manufacturing a perpendicular magnetic recording medium.

Priority is claimed on Japanese Patent Application No. 2008-249627, filed Sep. 29, 2008, the content of which is incorporated herein by reference.

2. Description of Related Art

The recording density of hard disk devices (HDD), which are one type of magnetic recording and reproducing apparatus, is currently increasing at an annual rate of 50% or higher, and it is expected that this trend will continue in the future. Consequently, the development of magnetic recording heads, and the development of magnetic recording media suitable for high density recording is being advanced.

Currently, a magnetic recording medium that is installed in the commercially available magnetic recording and reproducing apparatus is a so-called perpendicular magnetic recording medium in which the axis of easy magnetization within a magnetic film is mainly oriented perpendicularly. In the perpendicular magnetic recording medium, even when recording density is increased, the effects of a demagnetizing field formed in the boundary region between recording bits are small and distinct bit boundaries are formed, thus enabling noise reduction. Furthermore, reduction in recording bit volume associated with the increase in recording density can be suppressed, and thus thermal stability can also be enhanced. Therefore, in recently years, a perpendicular magnetic recording medium has become of keen interest, and a medium structure suitable for perpendicular magnetic recording has been proposed.

In the meantime, in the conventionally magnetic recording media in which an in-plane recording system is employed, a texture processing has been conducted on the surface of a non-magnetic substrate before forming a magnetic layer or the like thereon. The texture processing refers to a processing in which a texture streak (fine irregularities) along the circumferential direction is formed on the surface of a non-magnetic substrate so that the medium surface has an adequate surface roughness and also that the magnetic recording medium is provided with the magnetic anisotropy along the circumferential direction. That is, when forming a magnetic layer on a disc substrate where fine texture streaks are present on the surface of a non-magnetic substrate, it has been known that electromagnetic conversion characteristics improve, as compared to the case where a magnetic layer is formed on a disc substrate where no texture streaks are present. This is because by conducting a texture processing on the surface of a disc substrate, the crystal orientation in the base layer and magnetic layer which are formed on the surface of this disc substrate improves. This enables enhancement of magnetic anisotropy of the magnetic layer and improvements in magnetic properties such as the resistance to thermal fluctuation.

The texture processing is conducted by supplying a polishing slurry to the surface of a disc substrate while rotating this disc substrate and pressing a running polishing tape onto the surface of the disc substrate (for example, refer to Patent Document 1, i.e. Japanese Unexamined Patent Application, First Publication No. 2004-178777 and Patent Document 2, i.e. Japanese Unexamined Patent Application, First Publication No. 2004-259417). In addition, as a polishing liquid, those in which diamond abrasive grains are dispersed in a dispersion medium have been used.

Moreover, in Patent Document 3, i.e. Japanese Unexamined Patent Application, First Publication No. 2008-108396, there is disclosed a method for manufacturing a perpendicular magnetic recording medium by which abnormal protrusions in the base layer formed of a Ni—P based alloy can be automatically removed while securing a flat surface with high accuracy for the base layer, and also adequate texture marks can be formed so that the magnetic orientation in the perpendicular direction is easily achieved without adversely affecting the magnetic orientation in the perpendicular magnetic recording medium.

On the other hand, in the manufacturing process of perpendicular magnetic recording media, no texture processing is generally conducted on a non-magnetic substrate and a non-magnetic substrate having a smooth surface is used. This is because if a magnetic film or the like is formed on the surface of a non-magnetic substrate when irregularities or scratches are present on the surface of the non-magnetic substrate, abnormal protrusions or the like are often formed at places where these irregularities or scratches are present. Accordingly, a substrate used for manufacturing a perpendicular magnetic recording medium is produced by undergoing a multitude of wrapping steps and polishing steps, and thus the surface thereof is satisfactorily smooth. However, after producing the substrate for a perpendicular magnetic recording medium, several days are required in many cases until the substrate is used for forming a magnetic film or the like thereon, and particles or the like are often adhered onto the surface of the substrate during that time. In addition, even higher smoothness is required for the surface of the substrate used for manufacturing a perpendicular magnetic recording medium, and demands for a polishing process which is capable of smoothing substrate surfaces have been increasing. Moreover, such polishing process is preferably conducted immediately prior to the formation of a magnetic film or the like on a substrate in order to reduce the extent of adherence of particles or the like onto the substrate as much as possible.

The present invention is made in order to solve the above-mentioned problems and provides a method for manufacturing a perpendicular magnetic recording medium that includes a step for forming a smooth substrate surface without generating abnormal protrusions or the like when forming a magnetic film or the like on the surface of the substrate.

SUMMARY OF THE INVENTION

As a result of intensive and extensive studies in order to solve the above problems, the present inventors discovered that a substrate with a smoother surface than ever before can be obtained by providing a polishing step in which the surface of a non-magnetic substrate is smoothed before forming a laminated structure composed of a magnetic layer or the like on the non-magnetic substrate, and using a polishing liquid in the polishing step which contains diamond particles at considerably lower concentrations than the conventional abrasives and also contains an organic polymer material containing a large amount of sulfonic group or carboxylic group and having a specific average molecular weight as a polishing accelerator, and thus completed the present invention.

That is, the present invention adopts the aspects described below.

(1) A first aspect of the present invention is a method for manufacturing a perpendicular magnetic recording medium which is a method for manufacturing a perpendicular magnetic recording medium by forming a laminated structure containing a soft magnetic layer and a perpendicular magnetic layer on top of a non-magnetic substrate, the method characterized by including a polishing step in which the surface of a non-magnetic substrate is smoothed before forming the laminated structure on top of the non-magnetic substrate, wherein a polishing liquid used in the polishing step contains diamond particles within a range from 0.001 to 0.05% by mass and also contains a polishing accelerator within a range from 10 to 100 times the amount of diamond particles, and the polishing accelerator is an organic polymer material containing a sulfonic group or a carboxylic group and having an average molecular weight of 4,000 to 10,000.

(2) A second aspect of the present invention is a method for manufacturing a perpendicular magnetic recording medium according to the above first aspect (1) characterized in that time from the completion of the polishing step until formation of the laminated structure on top of the non-magnetic substrate is within 10 hours.

(3) A third aspect of the present invention is a method for manufacturing a perpendicular magnetic recording medium according to the above first aspect (1) or second aspect (2) characterized in that the diamond particles are cluster diamond particles and primary particle size of the diamond particles is within a range from 1 nm to 10 nm whereas secondary particle size of the diamond particles is within a range from 50 nm to 100 nm.

(4) A fourth aspect of the present invention is a method for manufacturing a perpendicular magnetic recording medium according to any one of the above aspects (1) to (3) characterized in that the polishing accelerator having a sulfonic group or a carboxylic group is a polishing accelerator having sodium sulfonate or sodium carboxylate.

(5) A fifth aspect of the present invention is a method for manufacturing a perpendicular magnetic recording medium according to any one of the above aspects (1) to (4) characterized in that the non-magnetic substrate is a glass substrate.

According to the method for manufacturing a perpendicular magnetic recording medium of the present invention, by adopting the above-mentioned aspects, it is possible to form a smooth substrate surface without generating abnormal protrusions or the like when forming a magnetic film or the like on the surface of the substrate.

DETAILED DESCRIPTION OF THE INVENTION

One embodiment that employs the present invention will be described in detail below with reference to accompanying drawings.

<Method for Manufacturing a Magnetic Recording Medium>

Figure 1:
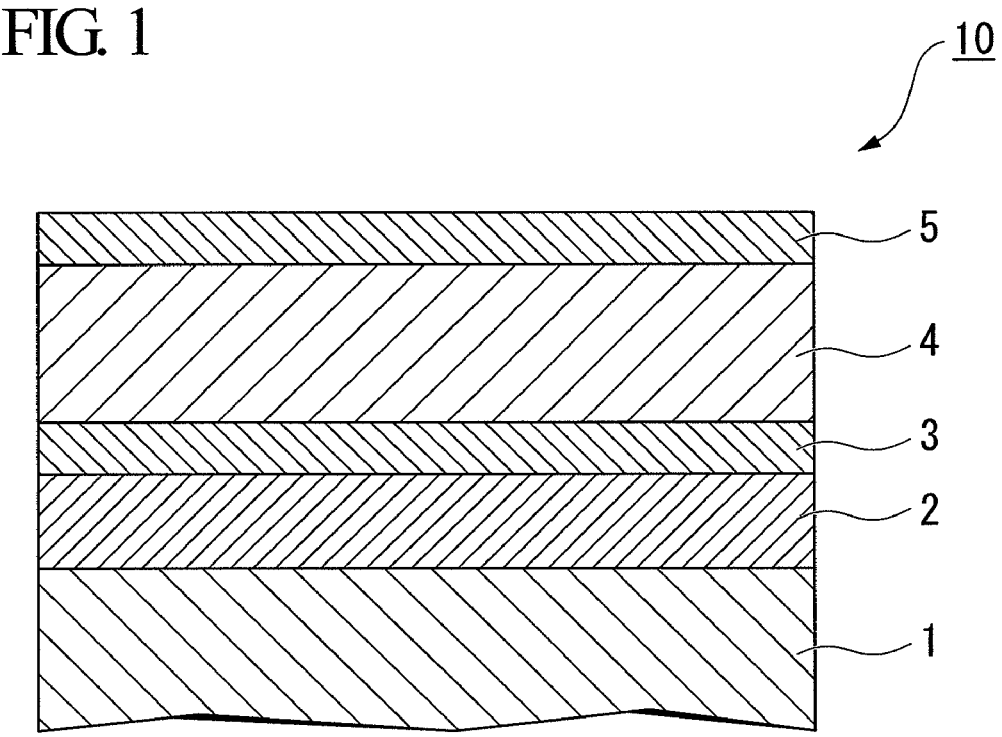
FIG. 1 is a cross sectional view showing one example of a perpendicular magnetic recording medium prepared by employing the present invention.

FIG. 1 is a cross sectional view showing one example of a perpendicular magnetic recording medium prepared by employing the present invention.

As shown in FIG. 1, a perpendicular magnetic recording medium 10 is formed by sequentially providing a soft magnetic underlayer 2, an orientation control layer 3, a perpendicular magnetic layer 4 and a protective layer 5 on top of a non-magnetic substrate 1, which has been subjected to a polishing process.

In a method for manufacturing the magnetic recording medium 10 according to the present embodiment, a polishing process is first conducted on the surface of the non-magnetic substrate 1 to smooth the surface of the non-magnetic substrate 1.

Figure 2:
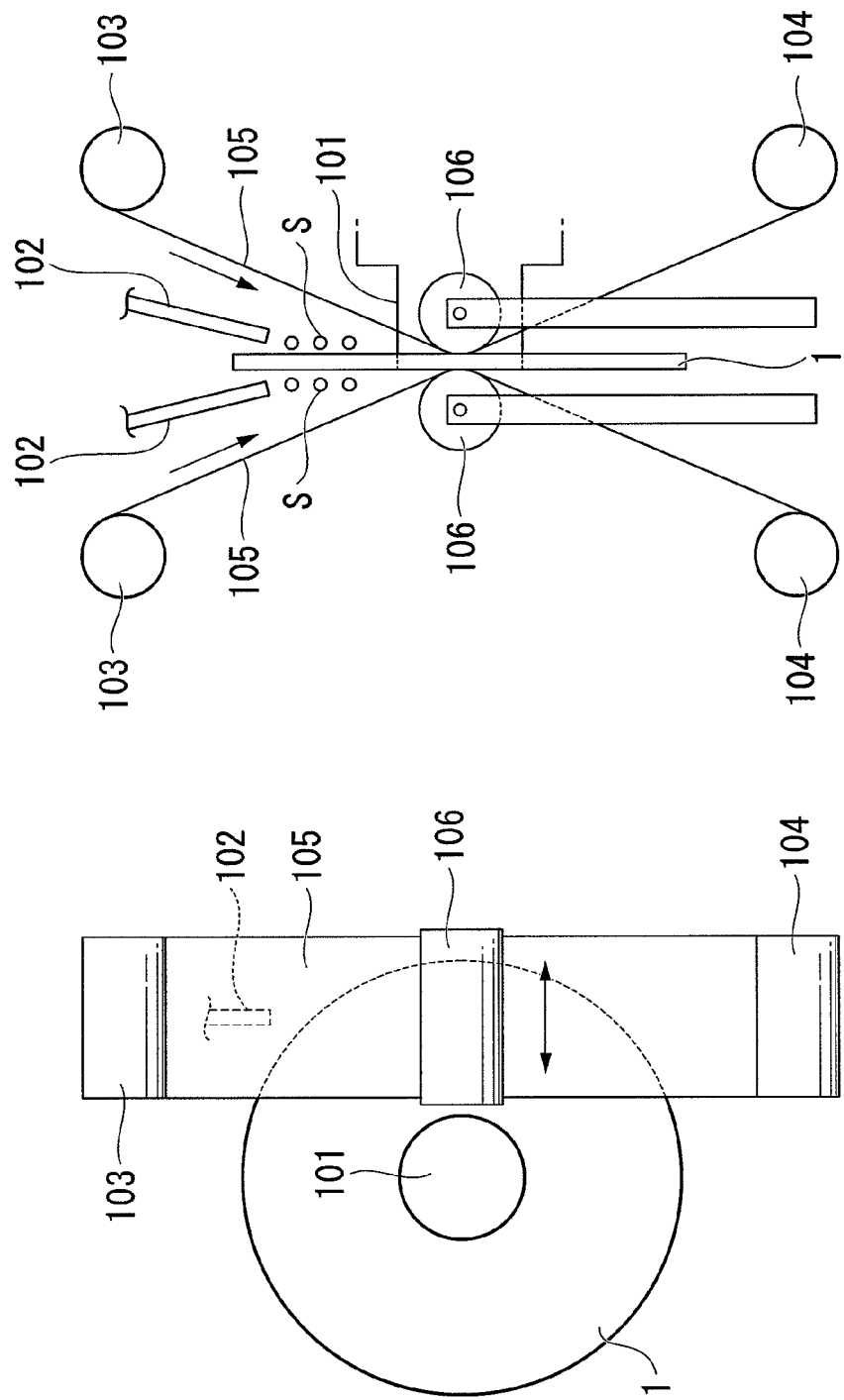
FIG. 2A is a diagram for explaining a step for conducting a polishing operation on the surface of a non-magnetic substrate 1 employed in the present embodiment, and is a side view showing one example of an apparatus therefor.
FIG. 2B is a diagram for explaining a step for conducting a polishing operation on the surface of a non-magnetic substrate 1 employed in the present embodiment, and is a plan view showing one example of an apparatus therefor.

Here, FIGS. 2A and 2B are diagrams for explaining a step for conducting a polishing process on the surface of the non-magnetic substrate 1, and FIG. 2A is a side view showing one example of an apparatus therefor whereas FIG. 2B is a plan view showing one example of an apparatus therefor.

As shown in FIGS. 2A and 2B, in this polishing process, the non-magnetic substrate 1 is fixed to a spindle 101 and the non-magnetic substrate 1 is rotated by rotating this spindle 101. Then a polishing liquid S is supplied to the surface of this rotating non-magnetic substrate 1 through a nozzle 102, and the polishing process is conducted by pressing a polishing tape 105 that is running between a supply roll 103 and a take-up roll 104 onto the surface of the non-magnetic substrate 1 via a pressing roller 106. Due to this process, the surface of the non-magnetic substrate 1 is polished and smoothed. It should be noted that the apparatus shown in FIGS. 2A and 2B is configured so that the polishing process can be conducted simultaneously on both sides of this non-magnetic substrate 1.

The present embodiment is characterized in that the polishing liquid S used in the polishing step contains diamond particles within a range from 0.001 to 0.05% by mass and also contains a polishing accelerator within a range from 10 to 100 times the amount of diamond particles, and that the polishing accelerator is an organic polymer material containing a sulfonic group or a carboxylic group and having an average molecular weight of 4,000 to 10,000.

Here, although the polishing liquid S is similar to a polishing liquid used in a step for polishing a non-magnetic substrate for magnetic recording media in terms of the components added therein, the amount of each component added is very different. That is, the polishing liquid used in the step for polishing substrates typically contains abrasive particles at about 1% by mass, and thus the polishing liquid S of the present embodiment has a very different composition from such typical polishing liquids. In addition, the polishing step in the present embodiment is preferably provided immediately prior to the formation of a magnetic film or the like on the non-magnetic substrate 1, unlike the case of manufacturing a non-magnetic substrate for magnetic recording media, and it is particularly desirable that the time from the completion of the polishing step until formation of the laminated structure on the non-magnetic substrate 1 be within 10 hours.

It is preferable to use cluster diamond particles as the diamond particles used in the polishing liquid S. In addition, the diamond particles preferably have a primary particle size within a range from 1 to 10 nm and a secondary particle size within a range from 50 to 100 nm. By using such particles as the diamond particles used in the polishing liquid S according to the present embodiment, even smoother substrate surface can be obtained in the step for polishing the non-magnetic substrate 1.

In addition, in the present embodiment, the sulfonic group or carboxylic group contained in the polishing accelerator is preferably either sodium sulfonate or sodium carboxylate. As a result, even smoother substrate surface can be obtained in the step for polishing the non-magnetic substrate 1.

The polishing liquid S of the present embodiment is formed by dispersing such diamond abrasive grains in a dispersion medium such as water and alcohol which contains a polishing accelerator.

Examples of the organic polymer material containing sodium sulfonate or sodium carboxylate to be contained in the polishing accelerator include commercially available products such as Geropon SC/213 (product name, manufactured by Rhodia), Geropon T/36 (product name, manufactured by Rhodia), Geropon TA/10 (product name, manufactured by Rhodia), Geropon TA/72 (product name, manufactured by Rhodia), New Calgen WG-5 (product name, manufactured by Takemoto Oil & Fat Co., Ltd.), Agrisol G-200 (product name, manufactured by Kao Corporation), Demol EP powder (product name, manufactured by Kao Corporation), Demol RNL (product name, manufactured by Kao Corporation), Isoban 600-SF35 (product name, manufactured by Kuraray Co., Ltd.), Polystar OM (product name, manufactured by NOF Corporation), Sokalan CP9 (product name, manufactured by BASF Japan Ltd.), Sokalan PA-15 (product name, manufactured by BASF Japan Ltd.), Toxanon GR-31A (product name, manufactured by Sanyo Chemical Industries, Ltd.), Solpol 7248 (product name, manufactured by Toho Chemical Industry Co., Ltd.), Sharoll AN-103P (product name, manufactured by Dai-Ichi Kogyo Seiyaku Co., Ltd.), Aron T-40 (product name, manufactured by Toagosei Co., Ltd.), Panakayaku CP (product name, manufactured by Nippon Kayaku Co., Ltd.), and Disrol H12C (product name, manufactured by Nippon Nyukazai Co., Ltd.).

Among these, it is particularly desirable to use Demol RNL (product name, manufactured by Kao Corporation) or Polystar OM (product name, manufactured by NOF Corporation).

As the non-magnetic substrate 1, it is preferable to use a glass substrate formed from amorphous glass, crystallized glass, or the like. As amorphous glass, for example, general-purpose glass, such as soda lime glass, aluminocate glass, or aluminosilicate glass can be used. As crystallized glass, for example, lithium-based crystallized glass or the like can be used. It should be noted that in the present invention, apart from such glass substrates, an aluminum substrate or the like on the surface of which is provided a hard film formed of NiP or the like can also be used.

When conducting a polishing operation on the surface of the non-magnetic substrate 1 formed of the above-mentioned glass, as shown in FIGS. 2A and 2B, it is preferable to set the rotation speed of the non-magnetic substrate 1 by the spindle 101 within a range from 50 to 2,000 rpm, and more preferably within a range from 200 to 800 rpm. When the rotation speed of the non-magnetic substrate 1 is less than 50 rpm, it takes a considerably long time to smooth the surface of the non-magnetic substrate 1. On the other hand, when the rotation speed of the non-magnetic substrate 1 exceeds 2,000 rpm, the polishing liquid S supplied from the nozzle 102 does not remain on the surface of the non-magnetic substrate 1 and is splashed around, and thus, it is not preferred.

The flow rate of the polishing liquid S supplied from the nozzle 102 is preferably within a range from 10 to 100 ml/min. The polishing liquid S may be supplied to the surface of the non-magnetic substrate 1 in a continuous manner, or with a certain time interval, or even in a non-continuous manner. In addition, the polishing liquid S may not only be supplied to the surface of the non-magnetic substrate 1, but also be supplied to the surface of the polishing tape 5 or be supplied between the non-magnetic substrate 1 and the polishing tape 5.

As the polishing tape 105, for example, a non-woven fabric tape, a woven fabric tape, a tape made of polyurethane foam, or the like can be used. Examples of the non-woven fabric tape include TX014F and KSN06LPU (both manufactured by Toray Industries, Inc.). Examples of the woven fabric tape include Toraysee (manufactured by Toray Industries, Inc.). In addition, non-woven fabric tapes are preferred since they are capable of suppressing the occurrence of scratches and the like, thereby making the average surface roughness Ra of the non-magnetic substrate 1 extremely low. Moreover, it is preferable that the fiber diameter of non-woven fabric tapes be no greater than 0.04 denier. By making the fiber diameter within this range, the average surface roughness Ra of the non-magnetic substrate 1 can be made low, and a polished surface with dense and uniform linear density can also be formed.

The polishing tape 105 can be run in the same direction with respect to the rotation direction of the non-magnetic substrate 1 or in the opposite direction thereto. At this time, it is preferable that the running speed of the polishing tape 105 be within a range from 10 to 150 mm/minute, and more preferably from 30 to 100 mm/minute. By making the running speed within this range, it is possible to suppress the occurrence of scratches or the like, the piercing of the surface of the non-magnetic substrate 1 by the abrasive grains in the polishing liquid S or their embedding therein.

In addition, the polishing tape 105 can be oscillated in the radial direction of the non-magnetic substrate 1 while being run at the same time. It is preferable that the oscillation rate in this case be within a range from 0.1 to 20 times/second, and more preferably from 0.5 to 10 times/second. When the oscillation rate is within this range, a satisfactory level of grinding is attained, and it is also possible to suppress the occurrence of scratches and to obtain a surface with a uniformly polished state.

The application pressure with which the polishing tape 105 is impressed by the pressing roller be within a range from $0.5 \times 9.8 \times 10^4$ to $1.5 \times 9.8 \times 10^4$ Pa, and more preferably within a range from $0.8 \times 9.8 \times 10^4$ to $1.2 \times 9.8 \times 10^4$ Pa. When the application pressure is within this range, it is possible to form a smooth, polished surface.

It should be noted that after conducting the aforementioned polishing process, it is preferable to carry out a cleaning step in which a cleaning tape running between the supply roll 103 and the take-up roll 104 but is not depicted in the drawings is pressed against the surface of the non-magnetic substrate 1 through the pressing roller 106. As a cleaning tape, for example, a flocked fabric tape, a non-woven fabric tape, a tape made of polyurethane foam, or the like can be used. Due to this step, the residues produced by the above-mentioned polishing process can be removed from the surface of the non-magnetic substrate 1.

In the present embodiment, the average surface roughness Ra of the non-magnetic substrate 1 after completion of the polishing step is preferably as low as possible. More specifically, it is preferably no greater than 2.5 Å, and more preferably no greater than 1.5 Å. Here, when the average surface roughness Ra of the non-magnetic substrate 1 exceeds 2.5 Å, abnormal protrusions and the like are readily formed when forming a magnetic layer or the like on the non-magnetic substrate 1. As a result, smoothness of the surface of a perpendicular magnetic recording medium deteriorates and glide height characteristics are impaired, and thus it becomes difficult, at the time of recording and reproducing, to make the flying height of a head low.

In the method for manufacturing the perpendicular magnetic recording medium 10 according to the present embodiment, on the non-magnetic substrate 1 which has been subjected to the aforementioned polishing step, the soft magnetic underlayer 2, the orientation control layer 3, and the perpendicular magnetic layer 4 are formed through a DC or RF magnetron sputtering process by use of sputtering targets that contain materials having the same compositions as the respective layers. Formation of the above respective layers using a sputtering process may be conducted as follows, for example.

First, the chamber employed for forming the layers is evacuated until the degree of vacuum within a range from $10^{-4}$ to $10^{-7}$ Pa is achieved. Subsequently, the non-magnetic substrate 1 is placed in the chamber, a sputtering gas (e.g., Ar gas) is introduced into the chamber, and discharging is carried out, to thereby form the layers through sputtering. During sputtering, power to be applied is regulated to 0.1 to 2 kW. When the discharging time and the power to be applied are regulated, the layer can be formed to a desired thickness.

The soft magnetic underlayer 2 is preferably formed on the non-magnetic substrate 1 with a thickness within a range from 15 to 100 nm by regulating the discharging time and the power to be applied.

When forming the soft magnetic underlayer 2, a sputtering target containing a soft magnetic material is preferably employed, since the soft magnetic underlayer 2 is readily formed. Examples of the soft magnetic material include CoFe alloys (e.g., CoFeTaZr and CoFeZrNb), FeCo-based alloys (e.g., FeCo and FeCoV), FeNi-based alloys (e.g., FeNi, FeNiMo, FeNiCr, and FeNiSi), FeAl-based alloys (e.g., FeAl, FeAlSi, FeAlSiCr, FeAlSiTiRu, and FeAlO), FeCr-based alloys (e.g., FeCr, FeCrTi, and FeCrCu), FeTa-based alloys (e.g., FeTa, FeTaC, and FeTaN), FeMg-based alloys (e.g., FeMgO), FeZr-based alloys (e.g., FeZrN), FeC-based alloys, FeN-based alloys, FeSi-based alloys, FeP-based alloys, FeNb-based alloys, FeHf-based alloys, FeB-based alloys, and materials containing Fe in an amount of at least 60 at %, such as FeAlO, FeMgO, FeTaN, and FeZrN. In addition, preferred examples include Co alloys containing Co in an amount of at least 80 at % and at least one element selected from among Zr, Nb, Ta, Cr, Mo, and the like and having an amorphous structure, such as CoZr-based alloys, CoZrNb-based alloys, CoZrTa-based alloys, CoZrCr-based alloys, and CoZrMo-based alloys.

The aforementioned sputtering target is an alloy target formed through a melting process, or a sintered alloy target.

The orientation control layer 3 is preferably formed, after formation of the soft magnetic underlayer 2, with a thickness within a range from 5 to 40 nm, more preferably within a range from 8 to 30 nm, by regulating the discharging time and the power to be applied. Examples of the sputtering target material employed for forming the orientation control layer 3 include Ru-based alloys, Ni-based alloys, and Co-based alloys.

Subsequently, the perpendicular magnetic layer 4 is formed. Formation of the perpendicular magnetic layer 4 is carried out in a similar manner by a sputtering process using a sputtering target. With respect to the perpendicular magnetic layer 4, there are magnetic layers having a granular structure containing an oxide and magnetic layers that do not contain an oxide. However, examples of the sputtering targets for forming a magnetic layer having a granular structure include $(Co_{14}Cr_{18}Pt)_{90}$-$(SiO_2)_{10}$ [i.e., 90 mol % of metal composition containing 14 at % of Cr, 18 at % of Pt and the balance being Co, and 10 mol % of an oxide composition formed of $SiO_2$], $(CO_{10}Cr_{16}Pt)_{92}$-$(SiO_2)_8$ [i.e., 92 mol % of metal composition containing 10 at % of Cr, 16 at % of Pt and the balance being Co, and 8 mol % of an oxide composition formed of $SiO_2$], and $(Co_8Cr_{14}Pt_4Nb)_{94}$-$(Cr_2O_3)_6$ [i.e., 94 mol % of metal composition containing 8 at % of Cr, 14 at % of Pt, 4 at % of Nb and the balance being Co, and 6 mol % of an oxide composition formed of $Cr_2O_3$], in addition to (CoCrPt)-$(Ta_2O_5)$, (CoCrPt)-$(Cr_2O_3)$-$(TiO_2)$, (CoCrPt)-$(Cr_2O_3)$-$(SiO_2)$, (CoCrPt)-$(Cr_2O_3)$-$(SiO_2)$-$(TiO_2)$, (CoCrPtMo)-(TiO), (CoCrPtW)-$(TiO_2)$, (CoCrPtB)-$(Al_2O_3)$, (CoCrPtTaNd)-(MgO), (CoCrPtBCu)-$(Y_2O_3)$, and (CoCrPtRu)-$(SiO_2)$.

Here, the amount of oxide content is preferably equal to or more than 3 mol % and equal to or less than 18 mol %, and more preferably equal to or more than 6 mol % and equal to or less than 13 mol %, with respect to the amount of Co, Cr and Pt combined.

In addition, a magnetic layer that contains no oxides is also formed in a similar manner by a sputtering process using a sputtering target. With respect to the alloy composition of magnetic layers, for example, $Co_{14-24}Cr_{8-22}Pt$ [i.e., 14 to 24 at % of Cr, 8 to 22 at % of Pt and the balance being Co] in CoCrPt-based alloys and $Co_{10-24}Cr_{8-22}Pt_{0-16}B$ [i.e., 10 to 24 at % of Cr, 8 to 22 at % of Pt, 1 to 16 at % of B and the balance being Co] in CoCrPtB-based alloys are preferred. Also in other alloys having different compositions, $Co_{10-24}Cr_{1-5}Ta$ [i.e., 10 to 24 at % of Cr, 8 to 22 at % of Pt, 1 to 5 at % of Ta and the balance being Co] in CoCrPtTa-based alloys and $CO_{10-24}Cr_{8-22}Pt_{1-5}Ta_{1-10}B$ [i.e., 10 to 24 at % of Cr, 8 to 22 at % of Pt, 1 to 5 at % of Ta, 1 to 10 at % of B and the balance being Co] in CoCrPtTaB-based alloys are preferred, as well as materials such as CoCrPtBNd-based alloys, CoCrPtTaNd-based alloys, CoCrPtNb-based alloys, CoCrPtBW-based alloys, CoCrPtMo-based alloys, CoCrPtCuRuBNd-based alloys and CoCrPtRe-based alloys.

After forming the perpendicular magnetic layer 4, the protective layer 5 is formed through any known technique, such as a sputtering process, a plasma CVD process, or a combination thereof. This protective layer 5 includes carbon, for example, as the major component thereof.

Further, if desired, a fluorine-based lubricant, such as perfluoropolyether, is applied onto the protective layer 5 through, for example, a dipping method or a spin coating method, to thereby form a lubricating layer 6.

In the above described manner, the perpendicular magnetic recording medium 10 shown in FIG. 1 is manufactured.

<Magnetic Recording and Reproducing Apparatus>

Figure 3:
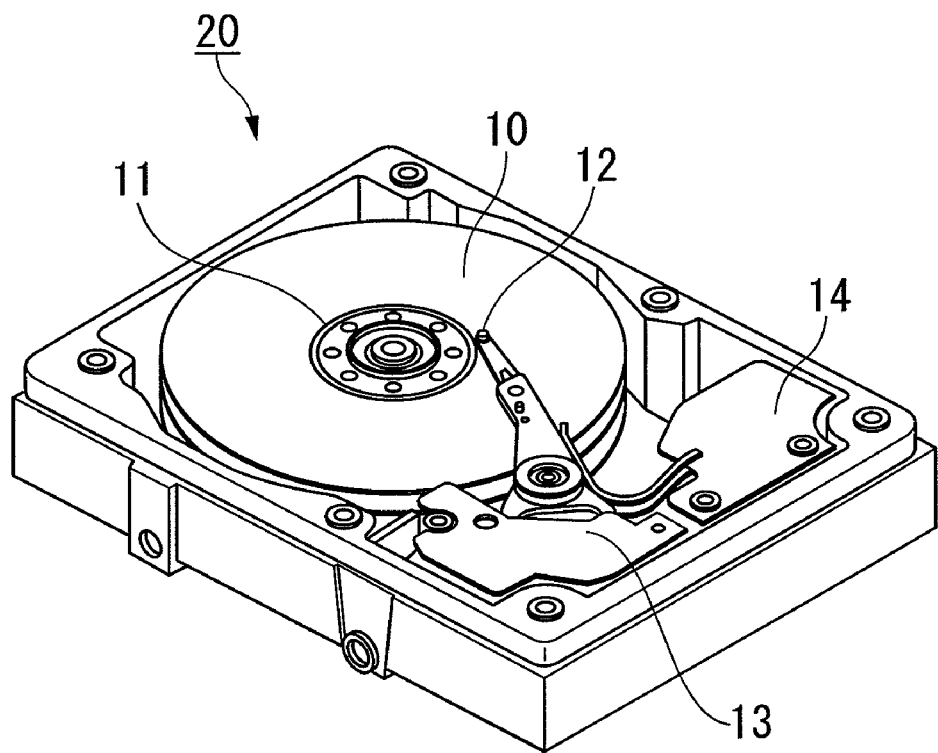
FIG. 3 is a cross sectional diagram showing one example of a magnetic recording and reproducing apparatus using the perpendicular magnetic recording medium manufactured by the manufacturing method according to the present embodiment.

FIG. 3 is a cross sectional diagram showing one example of a magnetic recording and reproducing apparatus using the perpendicular magnetic recording medium 10 manufactured by the manufacturing method described above.

As shown in FIG. 3, the magnetic recording and reproducing apparatus 20 includes the perpendicular magnetic recording medium 10 having a configuration shown in FIG. 1, a medium driving unit 11 that rotates the perpendicular magnetic recording medium 10, a magnetic head 12 that records or reproduces information on or from the perpendicular magnetic recording medium 10, a head driving unit 13 that moves the magnetic head 12 relative to the perpendicular magnetic recording medium 10, and a recording/reproducing signal processing system 14. The recording/reproducing signal processing system 14 is capable of processing data input from the outside and transmitting recording signals to the magnetic head 12. In addition, the recording/reproducing signal processing system 14 is capable of processing reproducing signals from the magnetic head 12 and transmitting data to the outside.

As the magnetic head 12, a head suitable for high recording density and having an anisotropic magnetoresistive (AMR) element using an AMR effect, a giant magnetoresistive (GMR) element using a GMR effect or the like as a reproducing element can be used.

EXAMPLES

Effects of the present invention will be described more clearly below based on a series of Examples. However, the present invention is in no way limited to the following Examples, and additions, omissions, substitutions, and other modifications can be made, where appropriate, without departing from the spirit or scope of the present invention.

Conditions for Preparing Samples for Evaluation

Example 1

In Example 1, a glass substrate formed of crystallized glass manufactured by KMG Corporation was used as a non-magnetic substrate. The size of the non-magnetic substrate was 48 mm in outer diameter, 12 mm in inner diameter, and 0.508 mm in substrate thickness. Then, a polishing process was conducted on the surface of this non-magnetic substrate. The conditions for the polishing process were as follows. That is, in terms of the abrasive grains contained in an abrasive, cluster diamond particles having a primary particle size of 5 nm and a secondary particle size of 70 nm were used at a concentration of 0.01% by mass. Polystar OM having a molecular weight of about 6,000 was then added thereto as a polishing accelerator so that active ingredients were 50 fold relative to the cluster diamond particles. Note that pure water was used as a solvent for the abrasive. The abrasive was dropwise added at a dropping rate of 50 ml/minute for 2 seconds before the start of the polishing process. In addition, a woven fabric made of polyester was used as a polishing tape, and the running speed of the polishing tape was set to 75 mm/minute. Moreover, the rotation speed of the non-magnetic substrate was 600 rpm, and the oscillation rate of the non-magnetic substrate was 120 times/minute. Furthermore, the application pressure with which the polishing tape was impressed was 2.0 kgf (19.6 N), and the time for the polishing process was set to 10 seconds.

After washing this glass substrate, it was placed in a deposition chamber of a DC magnetron sputtering apparatus (C-3010 manufactured by Canon ANELVA Corporation), and the deposition chamber was evacuated until an ultimate pressure of $1\times10^{-5}$ Pa was achieved. Thereafter, while the temperature of the substrate was maintained at 100° C. or less, a soft magnetic layer having a thickness of 100 nm was formed on the glass substrate through sputtering by use of a Co-$_4$Zr-$_7$Nb [i.e., 4 at % of Zr, 7 at % of Nb and the balance being Co] target. A soft magnetic underlayer was formed by depositing a Ru layer having a thickness of 8 nm on this resulting soft magnetic layer, followed by further deposition of a soft magnetic layer composed of Co-$_4$Zr-$_7$Nb and having a thickness of 100 nm thereon.

Subsequently, on the soft magnetic underlayer, a $Ni_6W$ layer having a thickness of 10 nm and a Ru layer having a thickness of 20 nm were formed in this order using a $Ni_6W$ target [i.e., 6 at % of W and the balance being Ni] and a Ru target, respectively, thereby forming an orientation control layer.

Further, on the orientation control layer, a magnetic layer composed of $(Co_{13}Cr_{16}Pt)_{90}$-$(SiO_2)_4$-$(Cr_2O_3)_3$-$(TiO_2)_3$ [i.e., 90 mol % of alloy composition containing 13 at % of Cr, 16 at % of Pt and the balance being Co, 4 mol % of an oxide composition formed of $SiO_2$, 3 mol % of an oxide composition formed of $Cr_2O_3$ and 3 mol % of an oxide composition formed of $TiO_2$] and having a thickness of 60 nm was formed.

Subsequently, on this magnetic layer, a non-magnetic layer composed of $(Co_{20}Cr)_{88}$-$(TiO_2)_{12}$ and having a thickness of 10 nm was formed.

Then, on this non-magnetic layer, a magnetic layer composed of $(Co_{95}Cr_{16}Pt_7Ru)_{92}$-$(SiO_2)_5$-$(Cr_2O_3)_3$ and having a thickness of 30 nm was formed.

Thereafter, on this magnetic layer, a non-magnetic layer composed of Ru and having a thickness of 10 nm was formed.

Then, on this non-magnetic layer, a perpendicular magnetic layer having a thickness of 10 nm was formed using a target composed of $Co_{16}Cr_{16}Pt_8B$ [i.e., 16 at % of Cr, 16 at % of Pt, 8 at % of B and the balance being Co] at a sputtering pressure of 3 Pa.

Subsequently, a protective layer having a thickness of 5 nm was formed through a CVD process. Then, a lubricating layer composed of perfluoropolyether was formed through a dipping process, thereby yielding a perpendicular magnetic recording medium of Example 1.

Examples 2 Through 5

In these Examples, a perpendicular magnetic recording medium was manufactured by the same method as in Example 1 except that conditions for the polishing step were changed. The conditions for the polishing step are shown in Table 1.

Comparative Example 1

A perpendicular magnetic recording medium was manufactured by the same method as in Example 1 except that the polishing step was not provided.

Comparative Examples 2 Through 5

In these Comparative Examples, a perpendicular magnetic recording medium was manufactured by the same method as in Example 1 except that conditions for the polishing step were changed. The conditions for the polishing step are shown in Table 1.

<Method for Evaluating Magnetic Properties>

Magnetic properties of the perpendicular magnetic recording media obtained in the above-mentioned Examples 1 through 5 and Comparative Examples 1 through 5 were evaluated.

Recording and reproducing properties were measured and evaluated by use of a read/write analyzer RWA1632 and a spin stand S1701 MP (manufactured by Guzik Technical Enterprises, USA). A head in which a single magnetic pole was employed for writing whereas a GMR element was employed in the recording unit was used as the head.

Recording properties (i.e., overwrite (OW) characteristics) were evaluated by first writing a signal of 700 kFCI and then overwriting it with a signal of 116 kFCI, followed by extraction of high frequency components with a frequency filter, and the data-writing capability was rated based on the residual ratio thereof.

The S/N ratio was measured at a recording density of 700 kFCI.

The thermal fluctuation characteristics were evaluated by conducting a writing at a recording density of 50 kFCI under the condition of 70° C. and then calculating the attenuation factor of the output relative to the reproducing output one second after the writing on the basis of a formula: $(S_o-S)\times 100/(S_o\times 3)$. In this formula, $S_o$ denotes the reproduction output one second after the writing and $S$ denotes the reproducing output 1,000 seconds after the writing. The results of evaluations made on these properties are shown in Table 1.

TABLE 1

| | Concentration of abrasive grains (% by mass) | Amount of polishing accelerator added relative to abrasive grains | OW (dB) | S/N (dB) | Thermal fluctuation (% decade) |
|---|---|---|---|---|---|
| Example 1 | 0.01 | 50 fold | 49.1 | 20.8 | 0.09 |
| Example 2 | 0.05 | 50 fold | 48.5 | 20.1 | 0.09 |
| Example 3 | 0.001 | 50 fold | 48.6 | 19.9 | 0.11 |
| Example 4 | 0.001 | 10 fold | 47.9 | 20.2 | 0.12 |
| Example 5 | 0.001 | 100 fold | 48.1 | 20.3 | 0.11 |
| Comparative Example 1 | — | — | 47.3 | 18.5 | 0.15 |
| Comparative Example 2 | 0.1 | 50 fold | 46.5 | 17.3 | 0.21 |
| Comparative Example 3 | 0.0005 | 50 fold | 47.4 | 18.7 | 0.17 |
| Comparative Example 4 | 0.01 | 1 fold | 47.4 | 18.7 | 0.13 |
| Comparative Example 5 | 0.01 | 200 fold | 47.5 | 18.8 | 0.13 |

<Evaluation Results>

From the results shown in Table 1, it is evident that the perpendicular magnetic recording media obtained in Examples 1 to 5 exhibited excellent properties in terms of the recording (OW) properties, S/N ratio, and thermal fluctuation characteristics, as compared to the perpendicular magnetic recording medium obtained in Test Example 1 prepared by a method in which no polishing step was conducted prior to the formation of a laminated structure on a glass substrate (non-magnetic substrate) or the perpendicular magnetic recording media obtained in Test Examples 2 to 4 prepared by conducting a polishing step where a polishing liquid was used which had a concentration of abrasive grains or an amount of polishing accelerator added relative to abrasive grains which was beyond the specified range according to the present invention.

The present invention can be applied for improving methods for manufacturing a perpendicular magnetic recording medium.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims

What is claimed is:

1. A method for manufacturing a perpendicular magnetic recording medium which is a method for manufacturing a perpendicular magnetic recording medium by forming a laminated structure containing a soft magnetic layer and a perpendicular magnetic layer on top of a non-magnetic substrate, the method comprising:
a polishing step in which the surface of a non-magnetic substrate is smoothed before forming the laminated structure on top of the non-magnetic substrate,
wherein a polishing liquid used in the polishing step contains abrasive grains consisting essentially of diamond particles within a range from 0.001 to 0.05% by mass and also contains a polishing accelerator within a range from 10 to 100 times the mass amount of diamond particles, and
the polishing accelerator is an organic polymer material containing a sulfonic group or a carboxylic group and having an average molecular weight of 4,000 to 10,000.

2. The method for manufacturing a perpendicular magnetic recording medium according to claim 1,
wherein time from the completion of the polishing step until formation of the laminated structure on top of the non-magnetic substrate is within 10 hours.

3. The method for manufacturing a perpendicular magnetic recording medium according to claim 1,
wherein the diamond particles are cluster diamond particles and primary particle size of the diamond particles is within a range from 1 nm to 10 nm whereas secondary particle size of the diamond particles is within a range from 50 nm to 100 nm.

4. The method for manufacturing a perpendicular magnetic recording medium according to claim 1,
wherein the polishing accelerator having a sulfonic group or a carboxylic group is a polishing accelerator having sodium sulfonate or sodium carboxylate.

5. The method for manufacturing a perpendicular magnetic recording medium according to claim 1, wherein the non-magnetic substrate is a glass substrate.

6. The method for manufacturing a perpendicular magnetic recording medium according to claim 2,
wherein the diamond particles are cluster diamond particles and primary particle size of the diamond particles is within a range from 1 nm to 10 nm whereas secondary particle size of the diamond particles is within a range from 50 nm to 100 nm.

7. The method for manufacturing a perpendicular magnetic recording medium according to claim 2, wherein the polishing accelerator having a sulfonic group or a carboxylic group is a polishing accelerator having sodium sulfonate or sodium carboxylate.

8. The method for manufacturing a perpendicular magnetic recording medium according to claim 3, wherein the polishing accelerator having a sulfonic group or a carboxylic group is a polishing accelerator having sodium sulfonate or sodium carboxylate.

9. The method for manufacturing a perpendicular magnetic recording medium according to claim 2, wherein the non-magnetic substrate is a glass substrate.

10. The method for manufacturing a perpendicular magnetic recording medium according to claim 3, wherein the non-magnetic substrate is a glass substrate.

11. The method for manufacturing a perpendicular magnetic recording medium according to claim 4, wherein the non-magnetic substrate is a glass substrate.

12. The method for manufacturing a perpendicular magnetic recording medium according to claim 1, wherein the polishing liquid contains diamond particles within a range from 0.001 to 0.01% by mass.

* * * * *